United States Patent
Li et al.

(10) Patent No.: US 11,146,699 B2
(45) Date of Patent: Oct. 12, 2021

(54) PROVIDING USER CONTROL OF RESOLUTION AND FILE SIZE FOR N-UP SCANNED FILES

(71) Applicant: Xerox Corporation, Norwalk, CT (US)

(72) Inventors: Xing Li, Webster, NY (US); Sherry W. Zhang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/813,843

(22) Filed: Mar. 10, 2020

(65) Prior Publication Data

US 2021/0289084 A1   Sep. 16, 2021

(51) Int. Cl.
*H04N 1/00* (2006.01)
*H04N 1/04* (2006.01)

(52) U.S. Cl.
CPC ..... *H04N 1/00482* (2013.01); *H04N 1/00424* (2013.01); *H04N 1/00427* (2013.01); *H04N 1/042* (2013.01)

(58) Field of Classification Search
CPC combination set(s) only.
See application file for complete search history.

(56) References Cited

U.S. PATENT DOCUMENTS

| | | | |
|---|---|---|---|
| 6,894,804 B2 | 5/2005 | Nguyen et al. | |
| 7,443,548 B2 | 10/2008 | Sprague et al. | |
| 7,859,708 B2 | 12/2010 | Austin | |
| 8,050,501 B2 | 11/2011 | Hirohata | |
| 8,423,900 B2 | 4/2013 | Fillion et al. | |
| 9,277,067 B2 * | 3/2016 | Faust | H04N 1/32122 |
| 9,607,360 B2 | 3/2017 | Gopalakrishnan et al. | |
| 2002/0163660 A1 * | 11/2002 | Iwai | G06F 3/1245 358/1.13 |
| 2003/0160975 A1 | 8/2003 | Skurdal et al. | |
| 2012/0212787 A1 * | 8/2012 | Hasegawa | H04N 1/3935 358/447 |
| 2015/0288849 A1 * | 10/2015 | Tredoux | H04N 1/32464 358/1.15 |
| 2017/0064120 A1 * | 3/2017 | Chung | G06F 3/1275 |
| 2020/0076972 A1 * | 3/2020 | Machida | H04N 1/00424 |

* cited by examiner

*Primary Examiner* — Helen Zong
(74) *Attorney, Agent, or Firm* — Gibb & Riley, LLC (57) ABSTRACT

Methods and apparatuses receive, into a user interface, an instruction to combine multiple scanned pages into one or more n-up sheets. In response to receiving the instruction to combine multiple scanned pages, a resolution field is output from the user interface. A user-set resolution for the scanned pages on the n-up sheets is received into the resolution field. With this, the scanned pages are scanned at the user-set resolution using a scanner. A processor is used to combine the scanned pages together into the n-up sheets at the user-set resolution of the scanned pages resolution, and the processor outputs the n-up sheets in an electronic file.

20 Claims, 9 Drawing Sheets

PROVIDING USER CONTROL OF RESOLUTION AND FILE SIZE FOR N-UP SCANNED FILES

BACKGROUND

Systems and methods herein generally relate to systems and methods that are used to scan documents, combine the scanned pages into n-up sheets, and output electronic files containing the n-up sheets.

When processing documents electronically or during printing, it can often be useful to arrange multiple scanned pages on a single sheet because doing so presents more information per sheet and can potentially reduce file size and/or the number of sheets printed. This processing is often referred to as "n-up" processing to represent the different number (n) of pages that can be included on each sheet. For example, 2 pages per sheet is referred to as 2-up and such pages are generally positioned side-by-side on the sheet, 4 pages per sheet is referred to as 4-up and such pages are generally position in the four quadrants of the sheet, etc., and the terminology "n-up" captures all numbers of pages per sheet and such sheets are generally arranged in an organized manner and evenly spaced from one another on the sheets.

One issue with n-up sheet processing is decreased resolution of the individual pages on each sheet. In common n-up processing, because each page represented takes up a smaller portion of the sheet, the resolution of each page is intentionally reduced by the n-up sheet processing apparatus. For example, in 4-up processing, the resolution of each sheet may be reduced (e.g., to 25%, 50%, etc., or higher or lower, of the page's original resolution). While this is helpful for maintaining reasonable file sizes and for making print processing less resource intensive when creating bitmaps, etc., it can have the disadvantage of reducing readability or the appearance of each individual page on the sheet.

This is especially true when n-up processing is performed to create electronic files because the sheets may not be printed, but instead such files may only be viewed. When such electronic files are enlarged during viewing, the decreased resolution can impact the user experience because of the reduced readability or appearance resulting from the reduced resolution.

Therefore, there is a tradeoff between resolution and file size during n-up sheet processing, in that increasing the resolution will also increase file size making such larger files harder to store and transmit. Attempts may be made to balance the competing interest between resolution and file size so that the decreased resolution may not be easily perceived by the user; however, no current solutions address the issue of resolution in n-up processing adequately. Such attempts have historically met a mixed reception because often the resolution and is decreased too much by these automated processes or the file sizes are still too large for easy storage or transmission.

SUMMARY

In order to address such issues, various methods herein receive, into a user interface of a scanning system, an instruction to combine multiple scanned pages into one or more n-up sheets. In response to receiving the instruction to combine multiple scanned pages, these methods output a resolution field from the user interface. The methods then receive what is referred to herein as a user-set resolution for the scanned pages on the n-up sheets into the resolution field. This user-set resolution can be an exact resolution or a minimum resolution which the scan resolutions must be at or above. In some methods herein, the user interface can also provide input fields to supply the quantity of the scanned pages to include in each n-up sheet, the total number of pages to be scanned, etc.

In some optional methods herein, the process of outputting the resolution field can include outputting individual scanned page resolution fields, potentially allowing each page to be scanned at a different resolution. In response, these methods can receive, into each of the individual scanned page resolution fields, what is referred to herein as page-specific resolution settings corresponding to one or more of the scanned pages (the scanned pages that receive page-specific resolution settings are referred to herein as individual resolution pages). Therefore, under this option, the one or more individual resolution pages can have their own page-specific resolution settings, while the remainder of the pages (referred to herein as remaining pages) will be scanned and processed according to the initially established user-set resolution. Because of this option, after the process of combining the scanned pages together, the scanned pages within the n-up sheets can have different resolutions relative to one another, with each of the individual resolution scanned pages being at a potentially different page-specific resolution setting, with the remaining pages being at the user-set resolution.

In other options, in response to the receipt of the user-set resolution and/or the page-specific resolution settings, these methods can output the expected file size of the n-up sheets (e.g., given the input resolution setting, the number of pages per n-up sheet, and number of n-up sheets, etc.) to allow the users to easily see how their resolution setting(s) affect overall file size. This allows the user to iteratively move the user-set resolution (and/or the page-specific resolution settings) up or down to stay within a desired file size.

After this, the methods herein scan the scanned pages at the user-set resolution and/or the page-specific resolution settings using a scanner of the scanning system. With these methods a processor of the scanning system is used to combine the scanned pages together into the n-up sheets at the user-set resolution (and/or the page-specific resolution settings) and the processor outputs the n-up sheets in an electronic file. Commencing with the final scanning process, the user's resolution(s) for the scanned pages remains unaltered and such resolutions are not reduced.

Other methods herein similarly receive, into a user interface of a scanning system, an instruction to combine multiple scanned pages into one or more n-up sheets. However, in response to receiving the instruction to combine multiple scanned pages, these methods output a file size field from the user interface. In response, these methods receive what is preferred to herein as a user-set file size into the file size field (which can be a set file size or a maximum file size that the n-up sheet file is to be at or below).

In some methods herein, the user interface can again provide input fields to supply the quantity of the scanned pages to include in each n-up sheet, the total number of pages to be scanned, etc. Here, these methods calculate, using the processor, what is preferred to herein as a calculated resolution of the scanned pages on the n-up sheets based on factors such as the user-set file size, the quantity of the scanned pages included in each n-up sheet, the total number of pages to be scanned, etc. Further, these methods output, through the user interface, this calculated resolution in response to receiving the user-set file size to provide the user with the option to adjust the user-set file size until a calculated resolution that is acceptable to the user is reached.

In some options herein, the methods can again output individual scanned page resolution fields, potentially allowing each page to be scanned at a different resolution. In response, these methods can receive, into each of the individual scanned page resolution fields, a page-specific resolution settings corresponding to one or more of the scanned pages (individual resolution pages). Therefore, under this option, the individual resolution page(s) can have their own page-specific resolution settings.

However, in these options, after receiving the page-specific resolution setting, the resolution of the remaining pages may change beyond the user's expectation. Therefore, the methods herein recalculate the previous calculated resolution for the remaining scanned pages not included in the individual scanned page(s) using the processor. The recalculation of the previous calculated resolution produces a "recalculated resolution" that is based on the page-specific resolution setting for the individual scanned page resolution pages, the user-set file size, the quantity of the scanned pages included in each n-up sheet, the total number of pages to be scanned, etc.

Here again these methods can optionally output, through the user interface, this recalculated resolution for the remaining pages in response to receiving the page-specific resolution setting(s) to again provide the user with the option to iteratively adjust the page-specific resolution setting(s) until a recalculated resolution that is acceptable to the user is reached.

With this, the methods herein scan the scanned pages at the user-set resolution and/or the page-specific resolution settings using a scanner of the scanning system. With these methods a processor of the scanning system is used to combine the scanned pages together into the n-up sheets at the user-set resolution (and/or the page-specific resolution settings). In optional methods that allow the page-specific resolution settings, after the process of combining the scanned pages together, the scanned pages within the n-up sheets can have different resolutions relative to one another, with the individual resolution scanned pages being at the page-specific resolution setting input by the user, and the remaining pages being at the recalculated resolution. Again, during the scanning and combining processes the resolution of the scanned pages is not changed. These methods output from the processor the n-up sheets in an electronic file.

Various systems and apparatuses herein include, among other components, a processor, and a scanner and a user interface operatively connected to the processor. The user interface is adapted to receive an instruction to combine multiple scanned pages into one or more n-up sheets. The user interface is adapted to output a resolution field in response to receiving the instruction to combine multiple scanned pages. The user interface is also adapted to receive, into the resolution field, a user-set resolution of the scanned pages on the n-up sheets. This user-set resolution can be an exact resolution or a minimum resolution which the scan resolutions must be at or above. The user interface can also be adapted to provide input fields to supply the quantity of the scanned pages to include in each n-up sheet, the total number of pages to be scanned, etc.

In some options herein, the user interface is adapted to additionally output individual scanned page resolution fields, potentially allowing each page to be scanned at a different resolution. In response, the user interface is adapted to receive, into each of the individual scanned page resolution fields, page-specific resolution settings corresponding to one or more of the scanned pages (individual resolution pages). Therefore, under this option, the individual resolution pages to be scanned (or groups of pages to be scanned) can have their own page-specific resolution settings, while the remaining pages will be scanned and processed according to the user-set resolution for all the scanned pages. Because of this option, after the process of combining the scanned pages together, the scanned pages within the n-up sheets can have different resolutions relative to one another, with each of the individual resolution scanned pages being at a potentially different page-specific resolution setting, with the remaining pages being at the user-set resolution.

In other options, in response to the receipt of the user-set resolution and/or the page-specific resolution settings, the user interface can be adapted to output the expected file size of the n-up sheets given the input resolution setting, the number of pages per n-up sheet, and number of n-up sheets, as calculated by the processor to allow the users to easily see how their resolution settings affect overall file size. This allows the user to iteratively move the user-set resolution (and/or the page-specific resolution settings) up or down to stay within a desired file size.

The scanner is adapted to scan the scanned pages at the user-set resolution and/or the page-specific resolution settings. The processor is adapted to combine the scanned pages together into the n-up sheets at the user-set resolution (and/or the page-specific resolution settings), and the processor is adapted to output the n-up sheets in an electronic file. In the scanning and combining processing, the user-set resolution (and/or the page-specific resolution settings) for the scanned pages remains unaltered.

In other system and apparatus embodiments herein, the user interface is again adapted to receive an instruction to combine multiple scanned pages into one or more n-up sheets. However, with these embodiments, the user interface is adapted to output a file size field in response to receiving the instruction to combine multiple scanned pages. The user interface is adapted receive a user-set file size into the file size field (which can be a set file size or a maximum file size that the n-up sheet file is to be at or below).

Again, the user interface can also be adapted to provide input fields to supply the quantity of the scanned pages to include in each n-up sheet, the total number of pages to be scanned, etc. Here, the processor is adapted to calculate a "calculated resolution" of the scanned pages on the n-up sheets based on the user-set file size, the quantity of the scanned pages included in each n-up sheet, the total number of pages to be scanned, etc. The user interface can be adapted to output this calculated resolution in response to receiving the user-set file size to provide the user with the option to iteratively adjust the user-set file size until a calculated resolution that is acceptable to the user is reached.

As with the previously described embodiments, in these embodiments the user interface is again adapted to output individual scanned page resolution fields. Similarly, the user interface is adapted to receive, into each of the individual scanned page resolution fields, a page-specific resolution setting for at least one corresponding individual resolution page. However, in these embodiments, after receiving the page-specific resolution setting, the processor is adapted to recalculate the previous calculated resolution for the remaining scanned pages not included in the individual scanned page(s). The recalculation of the previous calculated resolution produces a "recalculated resolution" that is based on the page-specific resolution setting for the individual scanned page resolution pages, the user-set file size, the quantity of the scanned pages included in each n-up sheet, the total number of pages to be scanned, etc.

The scanner is adapted to scan the scanned pages at the calculated resolution (or at the page-specific resolution setting for the individual scanned page resolution pages and the recalculated resolution for the remaining scanned pages). The processor is adapted to combine the scanned pages together into the n-up sheets at the calculated resolution(s). Further, the processor is adapted to output the n-up sheets in an electronic file. During the scanning and combining processing, the calculated resolution(s) of the scanned pages is unaltered.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, in n-up processing that reduces page size and places multiple pages on each sheet, there is a tradeoff between resolution and file size because increasing the resolution will also increase file size, making such files harder to store and transmit. In view of this, the systems and methods herein interact with users to achieve a balance of resolution and file size that accommodates the desires of the user.

Figure 1:
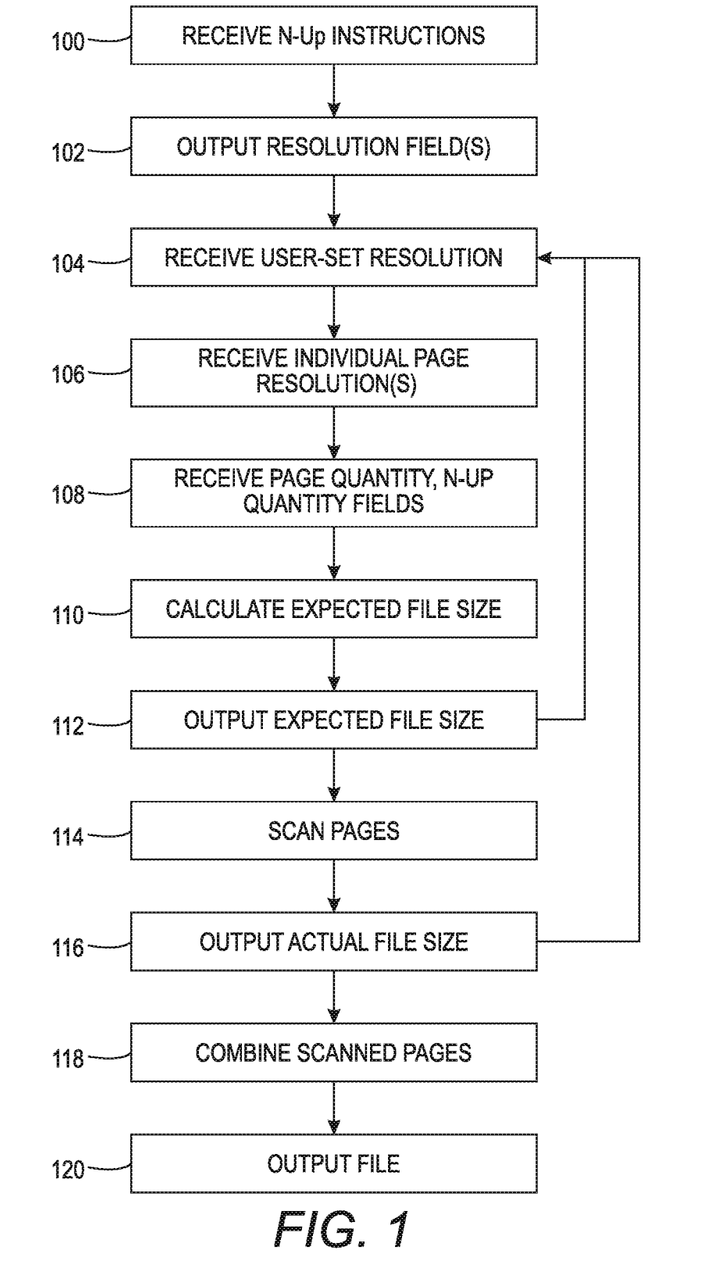
FIG. 1 is a flow diagram illustrating methods herein.
Figure 2:
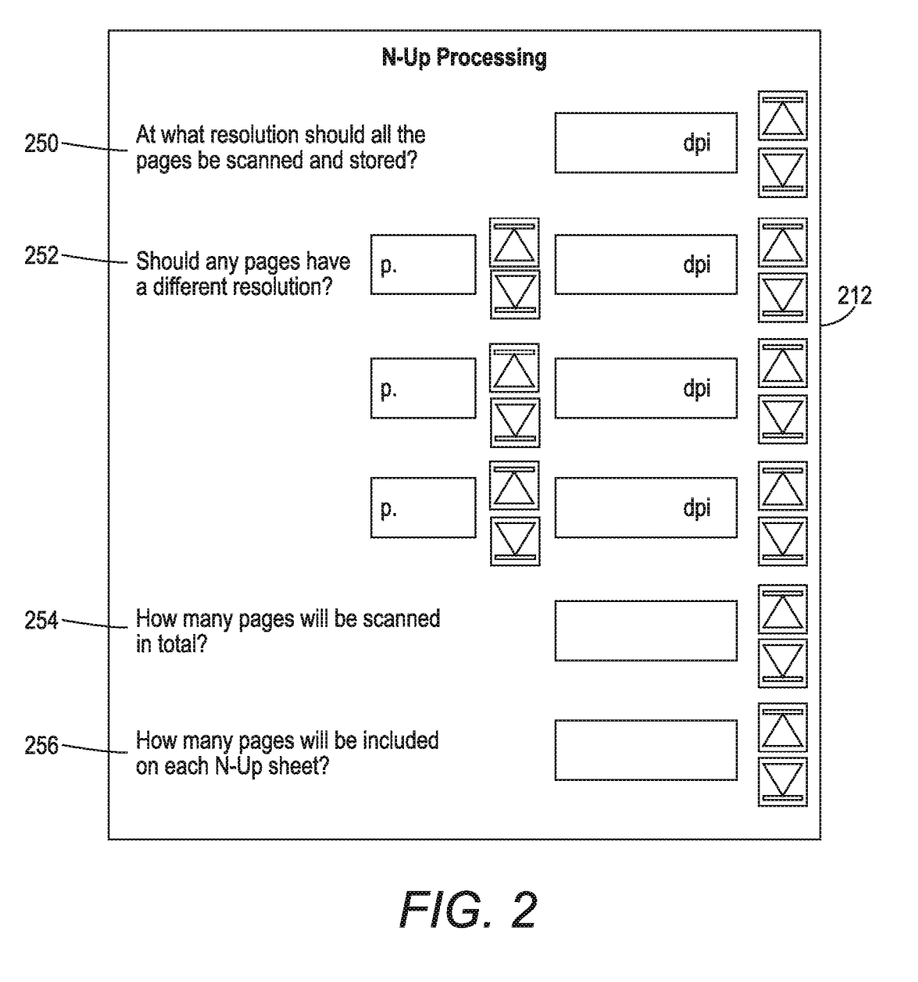
FIGS. 2 and 3 are representations of user interface screens provided by embodiments herein.
Figure 3:
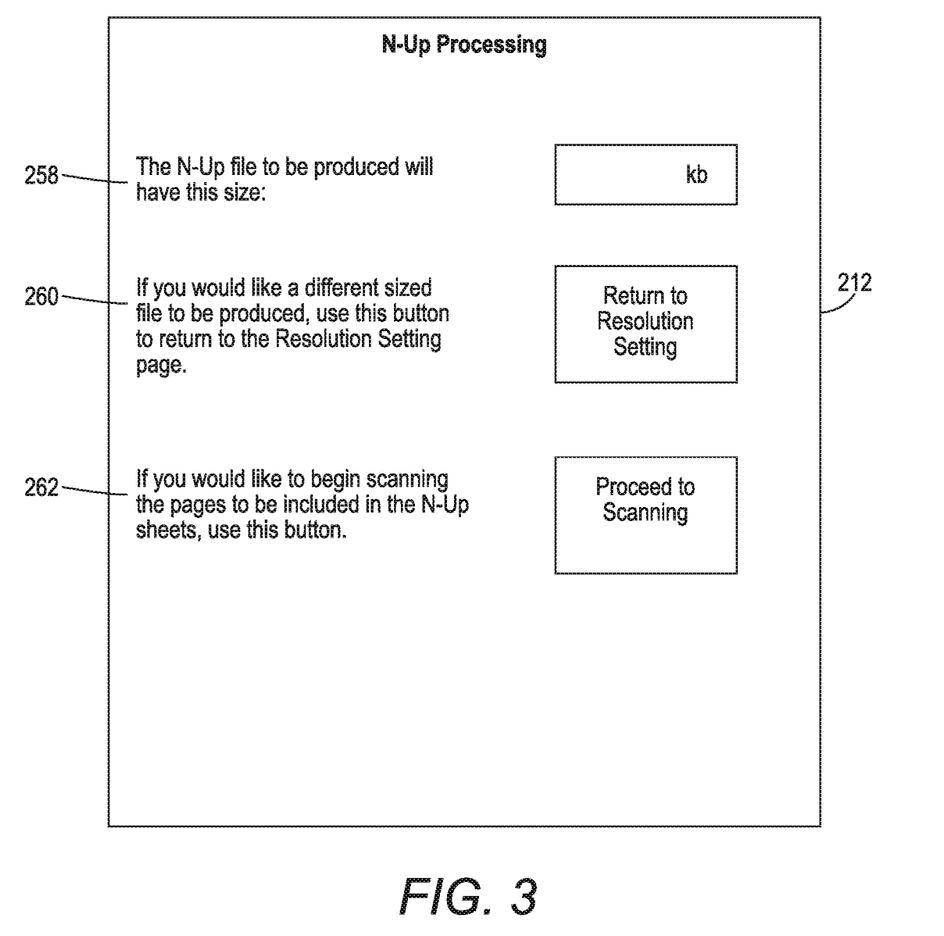

FIG. 1 is flowchart illustrating exemplary methods herein, and reference is additionally made to FIGS. 2 and 3 to help illustrate aspects of FIG. 1. In item 100, these methods receive, into a user interface of a scanning system, an instruction to combine multiple scanned pages into one or more n-up sheets. For example, methods herein are adapted to recognize user actions within local or web interfaces, processors, spreadsheets, databases, etc., that indicate the use of n-up processing as this type of instruction.

In response to receiving the instruction to combine multiple scanned pages, in item 102 these methods output a resolution field from the user interface. For example, as shown in FIG. 2, a user interface 212 display/screen can ask the user to enter the resolution at which all the pages should be scanned and stored (item 250). In the example shown in FIG. 2, the user is asked at what resolution should all the pages be scanned and stored, and provided an input box (potentially with toggle buttons) for supplying the resolution in, for example, dots per inch (dpi).

In item 104, the methods receive what is referred to herein as a "user-set resolution" for all the scanned pages on the n-up sheets into the resolution field 250. This user-set resolution can be an exact resolution or a minimum resolution which the scan resolutions must be at or above.

In some optional methods herein, the process of outputting the resolution field in item 102 can include outputting individual scanned page resolution fields (that are shown as items 252 in FIG. 2) potentially allowing each page to be scanned at a different resolution. For example, as shown in FIG. 2, the user is asked should any pages have a different resolution and provided input boxes (potentially with toggle buttons) for supplying the page number and resolution for that specific page number in, for example, dots per inch (dpi). Here, the page number is based on the order in which the pages will be scanned (such that, for example, the third page scanned will be page number 3). The page number can include a range of page numbers or multiple individually identified page numbers.

In response, in item 106 these methods can receive, into each of the individual scanned page resolution fields 252, what is referred to herein as page-specific resolution settings corresponding to one or more of the scanned pages (that are referred to herein as individual resolution pages). Therefore, under this option, the one or more individual resolution pages can have their own page-specific resolution settings, while the remainder of the pages (referred to herein as remaining pages) will be scanned and processed according to the initially established user-set resolution. Because of this option, after the process of combining the scanned pages together (see item 116 discussed below) the scanned pages within the n-up sheets can have different resolutions relative to one another, with each of the individual resolution scanned pages being at a potentially different page-specific resolution setting, with the remaining pages remaining at the user-set resolution.

In some methods herein, as shown in item 108, the user interface can also provide input fields (shown as items 254 and 256 in FIG. 2) to which the user can respond to supply the total quantity of pages to be scanned 254 and the quantity of the scanned pages to include in each n-up sheet 256, etc. More specifically, as shown in FIG. 2, the user can respond by supplying numbers to input boxes (potentially using toggle buttons) displayed following questions such as, how many pages will be scanned in total (item 254) and how many pages will be included on each n-up sheet (item 256), etc.

In other options, in response to the receipt of the user-set resolution and/or the page-specific resolution settings, in item 110 these methods can calculate the expected file size of the n-up sheets (given the input resolution setting, the number of pages per n-up sheet, and number of n-up sheets). For example, when calculating the expected file size, the methods and devices herein multiply the storage requirement for each page (e.g., dpi×page size (in dots, for example)×estimated storage requirement per dot) by the number of n-up pages per sheet and add to their value other storage requirements per sheet (e.g., header, metadata, sheet layout/formatting data, etc.) to determine the total electronic file storage requirements per sheet. The total storage requirements per sheet is then multiplied by the number of sheets that will be necessary (e.g., total number of pages to be scanned/number of pages per sheet). Other similar calculations are made to determine the expected file size in item 110.

The expected file size is output in item 112 (see item 258 in FIG. 3) to allow the users to easily see how their resolution setting(s) affects overall file size. For example, FIG. 3 shows that text can display that the n-up file to be produced will have a size, followed by a numerical box that can list the expected/estimated file size (e.g., kilobytes (kb), etc.) in any appropriate electronics size measurement unit (item 258).

From here, the user can optionally return to the resolution settings (see item 260 in FIG. 3) to allow the user to iteratively move the user-set resolution (and/or the page-specific resolution settings) up or down to stay within a desired file size, as shown by the arrow looping back from item 110 to item 104. For example, FIG. 3 shows (item 260) that display text can explain that if you would like a different sized file to be produced, use this button to return to the resolution setting page, with a button stating return to resolution setting, which would cause the menu screen shown in FIG. 2 to reappear. The user can repeatedly return to FIG. 2 and proceed to FIG. 3 in as many iterations as is necessary, until the user is satisfied with the resolution setting(s) and the expected file size.

FIG. 3 also shows an option that allows the user to proceed to the scanning process once they are satisfied with the final resolution setting(s) and the expected file size, as shown by item 262. For example, FIG. 3 shows (item 262) that display text can explain that if you would like to begin scanning the pages to be included in the n-up sheets, use this button, with a button stating proceed to scanning.

With this, in item 114 the methods herein scan the scanned pages at the user-set resolution and/or the page-specific resolution setting(s) using a scanner of the scanning system (for details, see the system and apparatus embodiments discussed below). More specifically, commonly known (and machine specific) screen instructions are output that guide the user through the necessary steps (e.g., loading physical pages to be scanned in the appropriate machine location, orientation, and order; pressing appropriate buttons; etc.) in order to allow the scanner to optically scan the physical pages and create electronica scanned pages.

While an acceptable estimate of the file size can be calculated without actually scanning the document based on the user-set resolution, the file size may vary depending on the content of the document. Therefore, in item 116 these methods can output the actual file size calculated with the actual scan data to the user through the user interface, which will be more accurate than the estimate produced in item 110. A screen similar to FIG. 3 is then presented to the user to allow the user to return to item 104 to change the user-set resolution, or to proceed to scanning once the file size is acceptable and the user-set resolution is finalized.

The electronically scanned pages are maintained in memory until they can be combined by the processor into the n-up sheets. With these methods a processor of the scanning system is used to combine the scanned pages together into the n-up sheets at the user-set resolution (and/or the page-specific resolution settings) in item 118 without altering the resolution used in the final scanning process 114.

In other words, the multiple scanned pages within each n-up sheet produced during the combining process in item 118 have the same resolution produced by the final scanning of the individual pages in item 114. This can increase scanning efficiency (reduce the time needed for scanning and the accompanying resource utilization) by having the scanning equipment automatically perform scanning at only the resolution needed. In contrast, scanning can be performed at a higher resolution and then the resolution of the images can be reduced by the processor to the user-set resolution. In item 120, the processor outputs the n-up sheets in an electronic file format. In the processing in items 114-120, the user's resolution(s) for the scanned pages remains unaltered once finally set by the user.

Figure 4:
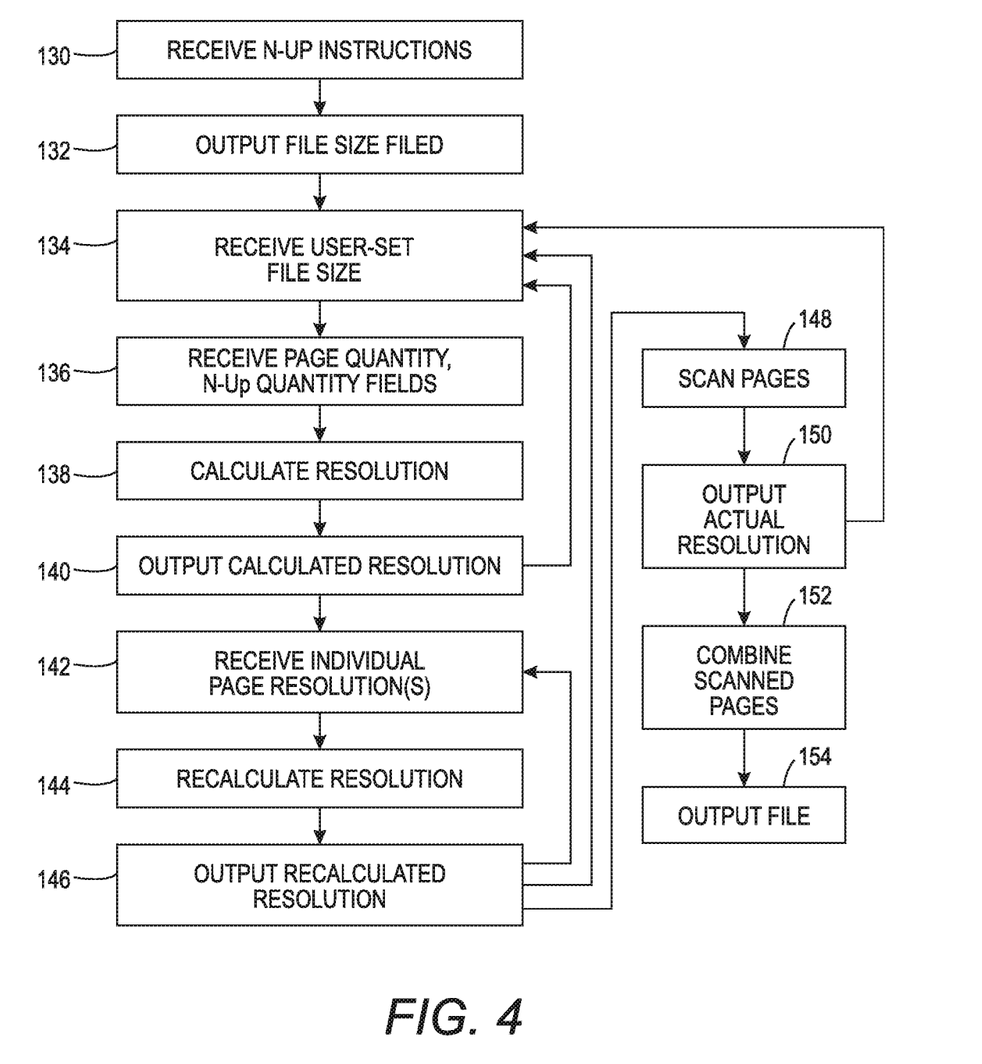
FIG. 4 is a flow diagram illustrating methods herein.
Figure 5:
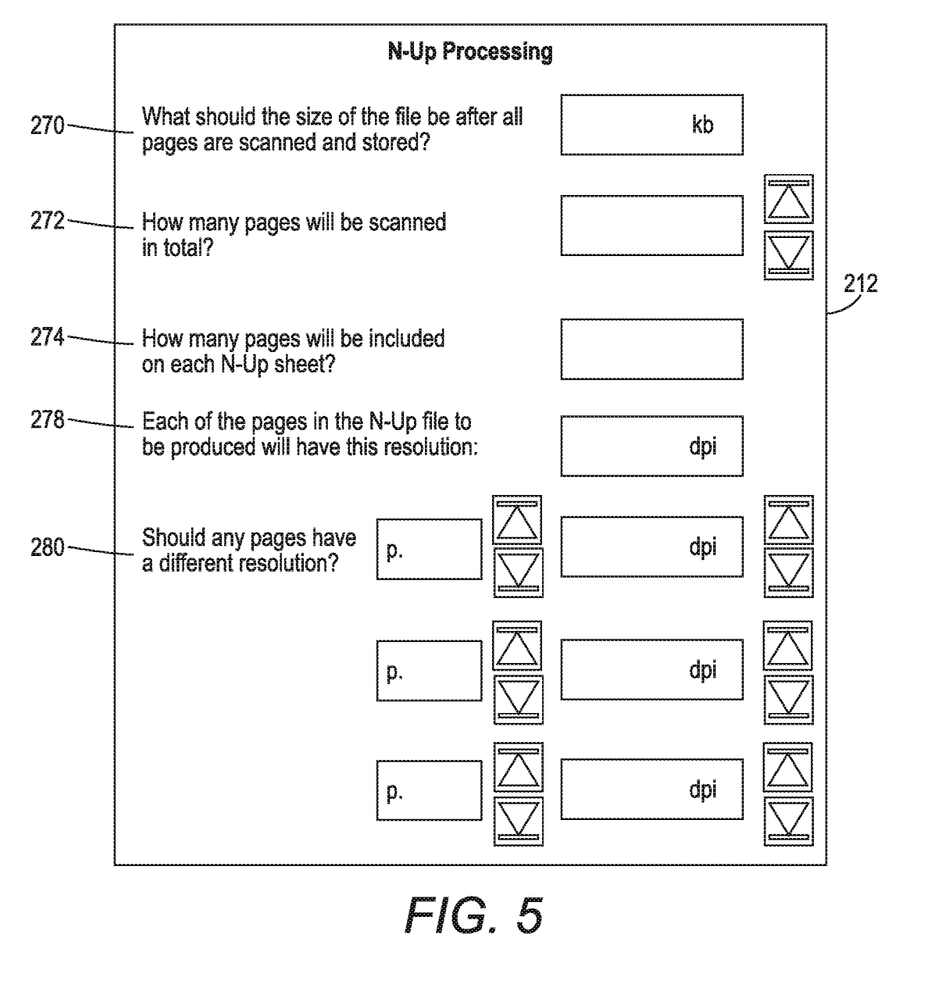
FIGS. 5 and 6 are representations of user interface screens provided by embodiments herein.
Figure 6:
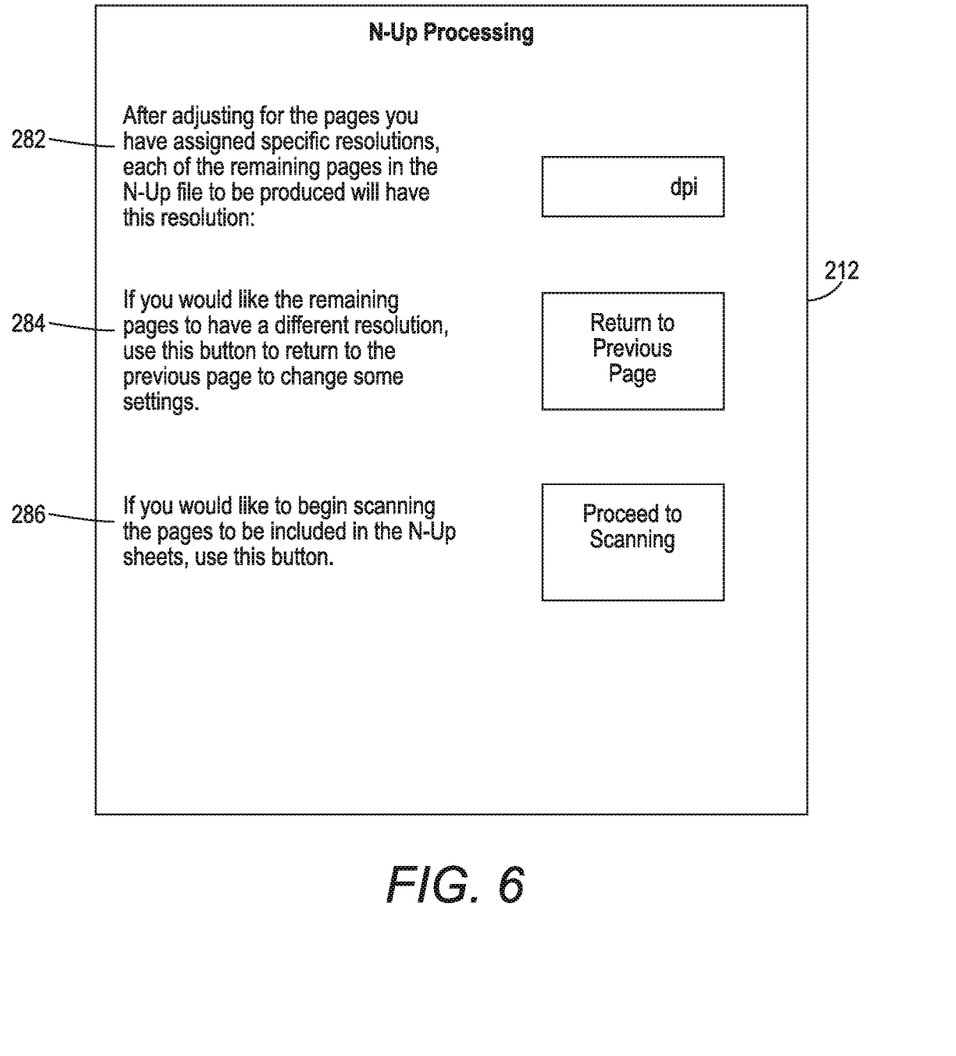

FIG. 4 is a flowchart illustrating aspects of other methods herein and reference is additionally made to FIGS. 5 and 6 to help illustrate aspects of FIG. 4. Such methods similarly receive, into a user interface of a scanning system in item 130, an instruction to combine multiple scanned pages into one or more n-up sheets. However, contrasted with the previously described methods, in response to receiving the instruction to combine multiple scanned pages these methods output a file size field from the user interface in item 132 and an exemplary file size field is shown as item 270 in FIG. 5. For example, in item 270 in FIG. 5, a question can be displayed to the user what should the size of the file be after all pages are scanned and stored, followed by an input box, with any electronic file size unit of measure (e.g., kb, mb, etc.). In response, in item 134 these methods receive a user-set file size into the file size field 270 (which can be a set size or a maximum file size that the n-up sheet file is to be at or below).

Similar to the above, in item 136 the user interface can again provide input fields to supply the quantity of the scanned pages to include in each of the n-up sheets, the total number of pages to be scanned, etc., and these are shown as items 272 and 274 in FIG. 5 (which are the same as items 254-256 in FIG. 2).

With this information, in item 138 these methods calculate (using the processor) a "calculated resolution" of the scanned pages on the n-up sheets based on the user-set file size, the quantity of the scanned pages included in each n-up sheet, the total number of pages to be scanned, etc. For example, when calculating the calculated resolution, the methods and devices herein determine the number of sheets (quantity of scanned pages divided by n-up pages per sheet) and subtract the other storage requirements per sheet (e.g., header, metadata, sheet layout/formatting data, etc.) from the user-set file size to find the amount of storage available for the n-up pages on the sheets. The amount of storage available for the n-up pages on the sheets is then divided by the number of n-up pages to be scanned to determine the amount of storage available per n-up page. The calculated resolution is then determined by dividing the amount of storage available per n-up page by the page size (in dots, for example) after being multiplied by the estimated storage requirements per dot (calculated resolution=per page storage/(page size×storage requirement per dot)). Other similar calculations are made to determine the calculated resolution size in item 138.

Further, in item 140 these methods output, through the user interface, this calculated resolution that is shown in FIG. 5 as item 278. For example, item 278 in FIG. 5 displays text that indicates that each of the pages in the n-up file to be produced will have this resolution, followed by followed by a number display box at any appropriate unit of measure (e.g., kb, mb, etc.). Here, these methods can also provide the user with an option to adjust the user-set file size until a calculated resolution that is acceptable to the user is reached (for example, see a similarly functioning button, menu item 284 in FIG. 6, discussed in detail below).

As with the previously described methods, these methods can also output individual scanned page resolution fields that are shown as item 280 in FIG. 5 (which are the same as items 252 in FIG. 2) potentially allowing each page to be scanned at a different resolution. In response, as shown in item 142, these methods can receive, into each of the individual scanned page resolution fields 280, a page-specific resolution settings corresponding to one or more of the scanned pages (that are referred to herein as individual resolution pages). Therefore, under this option, the individual resolution page(s) can have their own page-specific resolution settings.

However, in these options, after receiving the page-specific resolution setting, the methods recalculate the previous calculated resolution for the remaining scanned pages not included in the individual scanned page(s) using the processor in item 144. The recalculation of the previous calculated resolution produces a "recalculated resolution" that is based on the page-specific resolution setting for the individual scanned page resolution pages, the user-set file size, the quantity of the scanned pages included in each n-up sheet, the total number of pages to be scanned, etc. This calculation is similar to the calculation presented above in item 138; however, here the amount of storage available for the remaining pages is further reduced by the amount of storage the individual resolution pages will consume.

Here again these methods can optionally output, through the user interface in item 146, the recalculated resolution in response to receiving the page-specific resolution setting(s) and this is shown in FIG. 6 as item 282. These methods again provide the user with the option to adjust the user-set file size and the page-specific resolution setting(s) until a recalculated resolution that is acceptable to the user is reached, as shown by the arrows returning from item 146 to items 134 and 142. For example, the user interface 212 can display an option (item 284 in FIG. 6) with display text that can explain that if you would like the remaining pages to have a different resolution, use this button to return to the previous page to change some settings, with a button stating return to previous page, which would cause the menu screen shown in FIG. 5 to reappear.

Alternatively, as shown in item 286 in FIG. 6 (which is the same as item 262 in FIG. 3) the user may indicate that the calculated (or recalculated) resolution is acceptable and proceed to the scanning step through activation of the appropriate button. After this, the methods herein scan the scanned pages at the user-set resolution and/or the page-specific resolution setting(s) using a scanner of the scanning system in item 148.

While an acceptable estimate of the resolution can be calculated without actually scanning based on the file size selected, the resolution may vary depending on the content of the document. Therefore, in item 150 these methods can output the actual resolution calculated with the actual scan data, which will be more accurate than the estimate produced in item 138. A screen similar to FIG. 6 is then presented to the user to allow the user to return to item 134 to change the user-set file size if the actual resolution is unacceptable.

These methods use the processor to combine the scanned pages together into the n-up sheets at the user-set resolution (and/or the page-specific resolution settings) in item 150. In optional methods that allow the page-specific resolution settings, after the process of combining the scanned pages together in item 150, the scanned pages within the n-up sheets can have different resolutions relative to one another, with the individual resolution scanned pages being at the page-specific resolution setting input by the user, and the remaining pages being at the recalculated resolution. The methods output from the processor the n-up sheets in an electronic file in item 152. In this processing, the final user-set resolution(s) for the scanned pages remains unaltered.

Figure 7:
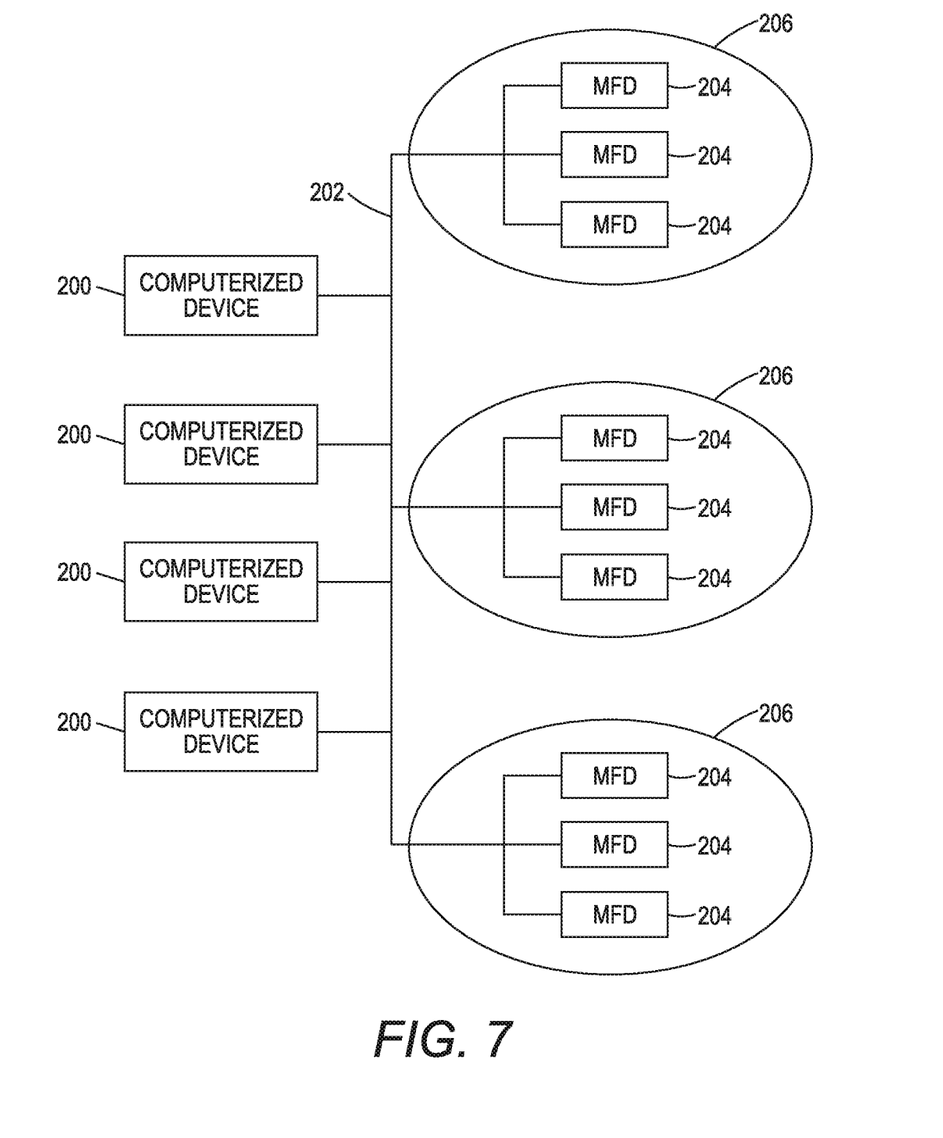
FIG. 7 is a schematic diagram illustrating systems herein.

As shown in FIG. 7, exemplary systems and apparatuses herein include various computerized devices 200, multi-function devices (MFDs) 204 located at various different physical locations 206. The computerized devices 200, 204 can include print servers, printing devices, personal computers, etc., and are in communication (operatively connected to one another) by way of a local or wide area (wired or wireless) network 202. The processing described herein can be performed buy one machine individually or by a combination of machines acting together. For example, the MFDs 204 can individually perform all functions described above in a stand-alone manner. Alternatively, the processing described above as being performed by the processor and some of the user interface display operations can be performed by various ones of the computerized devices 200, with the scanning process being performed by the MFDs 204 or stand-alone scanners.

Figure 8:
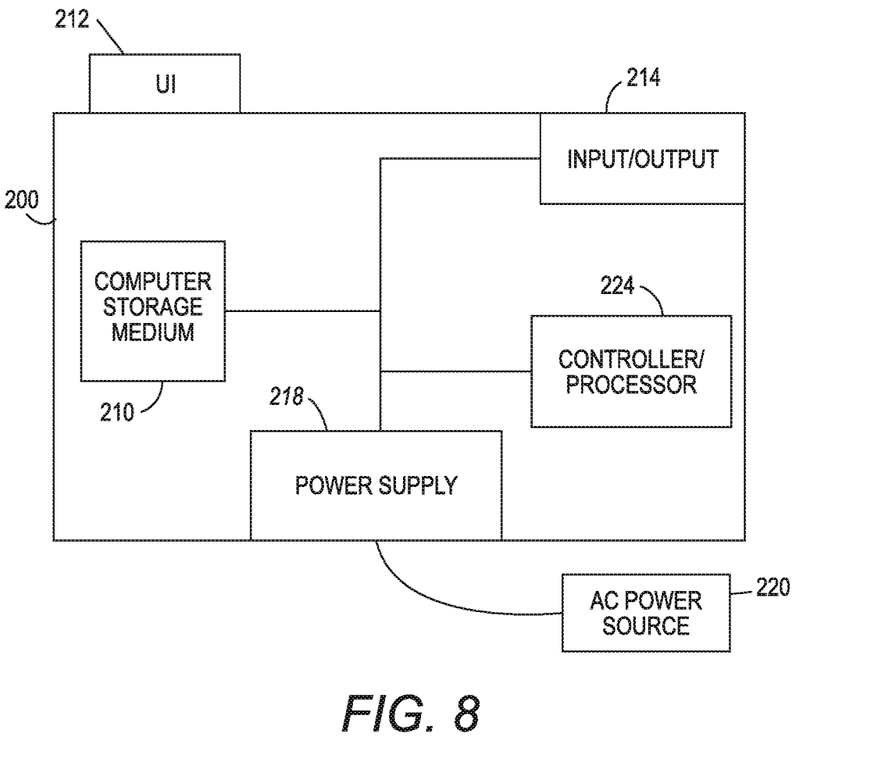
FIG. 8 is a schematic diagram illustrating devices herein.

FIG. 8 illustrates a computerized device 200 in more detail, which can be used with systems and methods herein and can comprise, for example, a print server, a personal computer, a portable computing device, etc. The computerized device 200 includes a controller/tangible processor 224 and a communications port (input/output) 214 operatively connected to the tangible processor 224 and to the computerized network 202 external to the computerized device 200. Also, the computerized device 200 can include at least one accessory functional component, such as a user interface (UI) assembly 212. The user may receive messages, instructions, and menu options from, and enter instructions through, the user interface or control panel 212.

The input/output device 214 is used for communications to and from the computerized device 200 and comprises a wired device or wireless device (of any form, whether currently known or developed in the future). The tangible processor 224 controls the various actions of the computerized device. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 8, a body housing has one or more functional components that operate on power supplied from an alternating current (AC) source 220 by the power supply 218. The power supply 218 can comprise a common power conversion unit, power storage element (e.g., a battery, etc.), etc.

Figure 9:
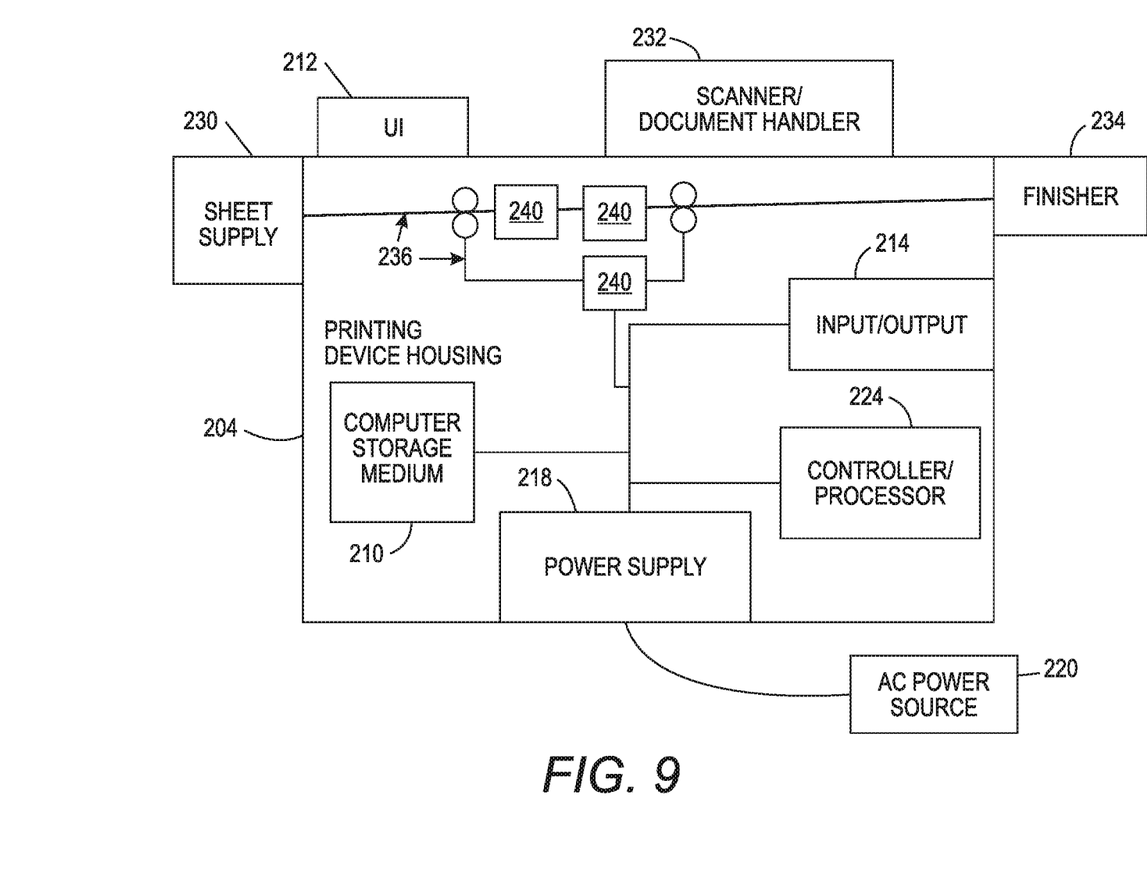
FIG. 9 is a schematic diagram illustrating devices herein.

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, various systems and apparatuses herein include, among other components, a processor 224, and a scanner 232 and a user interface 212 operatively connected to the processor 224. The user interface 212 is adapted to receive an instruction to combine multiple scanned pages into one or more n-up sheets. The user interface 212 is adapted to output a resolution field in response to receiving the instruction to combine multiple scanned pages. The user interface 212 is also be adapted to receive, into the resolution field, a user-set resolution of the scanned pages on the n-up sheets. This user-set resolution can be an exact resolution or a minimum resolution which the scan resolutions must be at or above. The user interface 212 can also be adapted to provide input fields to supply the quantity of the scanned pages to include in each n-up sheet, the total number of pages to be scanned, etc.

In some options herein, the user interface 212 is adapted to additionally output individual scanned page resolution fields, potentially allowing each page to be scanned at a different resolution. In response, the user interface 212 is adapted to receive, into each of the individual scanned page resolution fields, page-specific resolution settings corresponding to one or more of the scanned pages (individual resolution pages). Therefore, under this option, the individual resolution pages to be scanned (or groups of pages to be scanned) can have their own page-specific resolution settings, while the remaining pages will be scanned and processed according to the user-set resolution for all the scanned pages. Because of this option, after the process of combining the scanned pages together, the scanned pages within the n-up sheets can have different resolutions relative to one another, with each of the individual resolution scanned pages being at a potentially different page-specific resolution setting, with the remaining pages being at the user-set resolution.

In other options, in response to the receipt of the user-set resolution and/or the page-specific resolution settings, the user interface 212 can be adapted to output the expected file size of the n-up sheets given the input resolution setting, the number of pages per n-up sheet, and number of n-up sheets, as calculated by the processor 224 to allow the users to easily see how their resolution settings affect overall file size. This allows the user to iteratively move the user-set resolution (and/or the page-specific resolution settings) up or down to stay within a desired file size.

The scanner 232 is adapted to scan the scanned pages at the user-set resolution and/or the page-specific resolution settings. The processor 224 is adapted to combine the scanned pages together into the n-up sheets at the user-set resolution (and/or the page-specific resolution settings), and the processor 224 is adapted to output the n-up sheets in an electronic file. In the scanning and combining processing, the user-set resolution (and/or the page-specific resolution settings) for the scanned pages remains unaltered.

In other system and apparatus embodiments herein, the user interface 212 is again adapted to receive an instruction to combine multiple scanned pages into one or more n-up sheets. However, with these embodiments, the user interface 212 is adapted to output a file size field in response to receiving the instruction to combine multiple scanned pages. The user interface 212 is adapted receive a user-set file size into the file size field (which can be a set file size or a maximum file size that the n-up sheet file is to be at or below).

Again, the user interface 212 can also be adapted to provide input fields to supply the quantity of the scanned pages to include in each n-up sheet, the total number of pages to be scanned, etc. Here, the processor 224 is adapted to calculate a "calculated resolution" of the scanned pages on the n-up sheets based on the user-set file size, the quantity of the scanned pages included in each n-up sheet, the total number of pages to be scanned, etc. The user interface 212 can be adapted to output this calculated resolution in response to receiving the user-set file size to provide the user with the option to iteratively adjust the user-set file size until a calculated resolution that is acceptable to the user is reached.

As with the previously described embodiments, in these embodiments the user interface 212 is again adapted to output individual scanned page resolution fields. Similarly, the user interface 212 is adapted to receive, into each of the individual scanned page resolution fields, a page-specific resolution setting for at least one corresponding individual resolution page. However, in these embodiments, after receiving the page-specific resolution setting, the processor 224 is adapted to recalculate the previous calculated resolution for the remaining scanned pages not included in the individual scanned page(s). The recalculation of the previous calculated resolution produces a "recalculated resolution" that is based on the page-specific resolution setting for the individual scanned page resolution pages, the user-set file size, the quantity of the scanned pages included in each n-up sheet, the total number of pages to be scanned, etc.

The scanner 232 is adapted to scan the scanned pages at the calculated resolution (or at the page-specific resolution setting for the individual scanned page resolution pages and the recalculated resolution for the remaining scanned pages). The processor 224 is adapted to combine the scanned pages together into the n-up sheets at the calculated resolution(s). Further, the processor 224 is adapted to output the n-up sheets in an electronic file. During the scanning and combining processing, the calculated resolution(s) of the scanned pages is unaltered.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

Also, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
a processor;
a scanner operatively connected to the processor; and
a user interface operatively connected to the processor,
wherein the user interface is adapted to receive an instruction to combine multiple scanned pages into one or more n-up sheets,
wherein the user interface is adapted to output resolution fields in response to receiving the instruction to combine multiple scanned pages,
wherein the resolution fields comprise a user-set resolution field and a page-specific resolution field,
wherein the page-specific resolution field is adapted to receive a page-specific resolution setting used for at least one of the scanned pages,
wherein the user-set resolution field is adapted to receive a user-set resolution setting used for remaining ones of the scanned pages not using the page-specific resolution,
wherein the page-specific resolution setting is different from the user-set resolution setting,
wherein the user interface is adapted to receive, into the resolution fields, the user-set resolution setting and the page-specific resolution setting,
wherein the scanner is adapted to scan the scanned pages at the user-set resolution setting and the page-specific resolution setting,
wherein the processor is adapted to combine the scanned pages together into the n-up sheets at the user-set resolution setting and the page-specific resolution setting; and
wherein the processor is adapted to output the n-up sheets in an electronic file.

2. The apparatus according to claim 1, wherein the user interface is adapted to output a file size of the n-up sheets in response to receiving the user-set resolution setting.

3. The apparatus according to claim 1, wherein the user interface is adapted to output the resolution fields by outputting individual scanned page resolution fields, and
wherein the user interface is adapted to receive, into each of the individual scanned page resolution fields, the page-specific resolution setting for at least one corresponding scanned page of the scanned pages.

4. The apparatus according to claim 3, wherein after combining of the scanned pages together by the processor, the scanned pages within the n-up sheets have different resolutions with the at least one corresponding scanned page being at the page-specific resolution setting.

5. The apparatus according to claim 1, wherein during combining of the scanned pages together by the processor, the user-set resolution setting and the page-specific resolution setting are unaltered.

6. The apparatus according to claim 1, wherein the user interface is adapted to output a quantity field, wherein the quantity field is adapted to receive a quantity of the scanned pages to include in the n-up sheets.

7. The apparatus according to claim 1, wherein the user-set resolution setting comprises a minimum resolution that the scanned pages are to be at or above.

8. An apparatus comprising:
a processor;
a scanner operatively connected to the processor; and
a user interface operatively connected to the processor,
wherein the user interface is adapted to receive an instruction to combine multiple scanned pages into one or more n-up sheets, wherein the user interface is adapted to output a file size field and one or more individual scanned page resolution fields in response to receiving the instruction to combine multiple scanned pages, wherein the user interface is adapted to receive a user-set file size into the file size field and at least one page-specific resolution setting into the individual scanned page resolution fields;

wherein the processor is adapted to calculate a calculated resolution of the scanned pages on the n-up sheets based on the user-set file size and the page-specific resolution setting, wherein the scanner is adapted to scan the scanned pages at the calculated resolution and the page-specific resolution setting, wherein the processor is adapted to combine the scanned pages together into the n-up sheets at the calculated resolution and the page-specific resolution setting; and wherein the processor is adapted to output the n-up sheets in an electronic file.

9. The apparatus according to claim 8, wherein the user interface is adapted to output the calculated resolution in response to receiving the user-set file size and the page-specific resolution setting.

10. The apparatus according to claim 8,
wherein the user interface is adapted to receive, into each of the individual scanned page resolution fields, the page-specific resolution setting for at least one corresponding scanned page of the scanned pages.

11. The apparatus according to claim 10, wherein after receiving the page-specific resolution setting, the processor is adapted to recalculate the calculated resolution for remaining ones of the scanned pages not included in the at least one corresponding scanned page based on the user-set file size.

12. The apparatus according to claim 8, wherein during combining of the scanned pages together by the processor, the calculated resolution and the page-specific resolution setting of the scanned pages are unaltered.

13. The apparatus according to claim 8, wherein the user interface is adapted to output a quantity field, wherein the quantity field is adapted to receive a quantity of the scanned pages to include in the n-up sheets.

14. The apparatus according to claim 8, wherein the user-set file size comprises a maximum file size that the electronic files are to be at or below.

15. A method comprising:
receiving, into a user interface of a scanning system, an instruction to combine multiple scanned pages into one or more n-up sheets;

outputting resolution fields, by the user interface, in response to the receiving of the instruction to combine multiple scanned pages, wherein the resolution fields comprise a user-set resolution field and a page-specific resolution field;

receiving, into the page-specific resolution field, a page-specific resolution setting used for at least one of the scanned pages;

receiving, into the user-set resolution field, a user-set resolution setting used for the scanned pages combined to form the n-up sheets not using the page-specific resolution, wherein the page-specific resolution setting is different from the user-set resolution setting;

scanning the scanned pages at the user-set resolution setting and the page-specific resolution setting by a scanner of the scanning system;

combining the scanned pages together into the n-up sheets at the user-set resolution setting and the page-specific resolution setting, by a processor of the scanning system; and outputting the n-up sheets in an electronic file, by the processor.

16. The method according to claim 15, further comprising outputting a file size of the n-up sheets in response to the receiving of the user-set resolution setting.

17. The method according to claim 15, wherein the outputting of the resolution fields further comprises outputting individual scanned page resolution fields, and
wherein the methods further comprises receiving, into each of the individual scanned page resolution fields, the page-specific resolution setting for at least one corresponding scanned page of the scanned pages.

18. The method according to claim 17, wherein after the combining of the scanned pages together the scanned pages within the n-up sheets have different resolutions with the at least one corresponding scanned page being at the page-specific resolution setting.

19. The method according to claim 15, wherein during the combining of the scanned pages together, the user-set resolution setting and the page-specific resolution setting are unaltered.

20. The method according to claim 15, wherein the receiving of the instruction to combine multiple scanned pages further comprises receiving a quantity of the scanned pages to include in the n-up sheets.

* * * * *